US012276423B2

(12) United States Patent
Naik et al.

(10) Patent No.: US 12,276,423 B2
(45) Date of Patent: Apr. 15, 2025

(54) FLOATING PRIMARY VANE SWIRLER

(71) Applicant: General Electric Company, Schenectady, NY (US)

(72) Inventors: Pradeep Naik, Bengaluru (IN); David A. Lind, Lebanon, OH (US); Shai Birmaher, Cincinnati, OH (US); Ranganatha Narasimha Chiranthan, Bengaluru (IN); Ajoy Patra, Bengaluru (IN); Saket Singh, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 432 days.

(21) Appl. No.: 17/649,129

(22) Filed: Jan. 27, 2022

(65) Prior Publication Data

US 2023/0104395 A1 Apr. 6, 2023

(30) Foreign Application Priority Data

Sep. 23, 2021 (IN) .............................. 202111043087

(51) Int. Cl.
*F23R 3/14* (2006.01)
*F02C 7/22* (2006.01)
(Continued)

(52) U.S. Cl.
CPC .................. *F23R 3/14* (2013.01); *F02C 7/22* (2013.01); *F23R 3/28* (2013.01); *F23R 3/42* (2013.01); *F05D 2240/35* (2013.01)

(58) Field of Classification Search
CPC ...... F23R 3/14; F23R 3/28; F23R 3/42; F23R 3/283; F23R 3/286; F02C 7/22; F05D 2240/35
See application file for complete search history.

(56) References Cited

U.S. PATENT DOCUMENTS 4,070,826 A * 1/1978 Stenger ................. F23D 11/106
239/425
5,117,637 A * 6/1992 Howell ................... F23R 3/283
60/740
(Continued)

FOREIGN PATENT DOCUMENTS

EP 895024 B1 1/2003
EP 849529 B1 3/2004
(Continued)

OTHER PUBLICATIONS

K.P. Shanmugadas et al. "Fuel placement and atomization inside a gas-turbine fuel injector at realistic operating conditions", Proceeding of the Combustion Institute. vol. 38, Issue, 2, Apr. 2021. pp. 3261-3268.https://doi.org/10.1016/j.proci.2020.09.005.

*Primary Examiner* — Jason H Duger
(74) *Attorney, Agent, or Firm* — Venable LLP; Edward A. Kmett; Michele V. Frank

(57) ABSTRACT

A swirler assembly includes a primary swirler having a primary swirler connecting portion, a fuel nozzle connecting portion for connecting a fuel nozzle to the primary swirler, and a primary oxidizer flow passage that extends at least partially in the longitudinal direction, and a secondary swirler having a secondary swirler connecting member, where the primary swirler connecting portion and the secondary swirler connecting member engage to connect the primary swirler and the secondary swirler in the longitudinal direction, and to permit radial movement of the primary swirler with respect to the secondary swirler.

18 Claims, 8 Drawing Sheets

(51) Int. Cl.
*F23R 3/28* (2006.01)
*F23R 3/42* (2006.01)

(56) References Cited

U.S. PATENT DOCUMENTS

| | | |
|---|---|---|
| 5,197,290 A | 3/1993 | Lee et al. |
| 6,250,062 B1 | 6/2001 | Lawen, Jr. et al. |
| 6,345,505 B1 | 2/2002 | Green |
| 6,381,964 B1 | 5/2002 | Pritchard, Jr. et al. |
| 6,412,272 B1 | 7/2002 | Titterton, III et al. |
| 6,427,435 B1 | 8/2002 | Patterson et al. |
| 6,571,559 B1 | 6/2003 | Fortuna et al. |
| 6,581,386 B2 | 6/2003 | Young et al. |
| 6,976,363 B2 | 12/2005 | McMasters et al. |
| 7,062,920 B2 | 6/2006 | McMasters et al. |
| 7,104,066 B2 | 9/2006 | Leen et al. |
| 7,334,410 B2 | 2/2008 | Creighton et al. |
| 7,415,828 B2 | 8/2008 | Brown |
| 7,658,074 B2 | 2/2010 | Tuttle |
| 7,721,436 B2 | 5/2010 | Prociw et al. |
| 7,836,699 B2 | 11/2010 | Graves |
| 8,146,365 B2 | 4/2012 | Shum et al. |
| 8,291,706 B2 | 10/2012 | Tanner et al. |
| 8,689,563 B2 | 4/2014 | Low |
| 8,800,290 B2 | 8/2014 | Burd et al. |
| 9,335,050 B2 | 5/2016 | Cunha et al. |
| 9,376,985 B2 | 6/2016 | Burd |
| 9,400,104 B2 | 7/2016 | Low et al. |
| 9,441,836 B2 | 9/2016 | Cohen et al. |
| 9,447,974 B2 | 9/2016 | Max et al. |
| 9,791,153 B2 | 10/2017 | Dai et al. |
| 9,957,895 B2 | 5/2018 | Suciu et al. |
| 10,054,312 B2 | 8/2018 | Dai et al. |
| 10,101,031 B2 | 10/2018 | Williams et al. |
| 10,208,949 B2 | 2/2019 | Eastwood et al. |
| 10,591,163 B2 | 3/2020 | Porter et al. |
| 10,794,596 B2 | 10/2020 | Dai et al. |
| 2003/0010034 A1 | 1/2003 | Baudoin et al. |
| 2005/0223710 A1* | 10/2005 | Creighton ............... F23R 3/14 60/740 |
| 2006/0130483 A1 | 6/2006 | Howell et al. |
| 2009/0151357 A1 | 6/2009 | Pieussergues et al. |
| 2015/0285148 A1 | 10/2015 | Lovett et al. |
| 2016/0047315 A1 | 2/2016 | McCaldon et al. |
| 2016/0209038 A1 | 7/2016 | Kopp-Vaughan et al. |
| 2016/0273453 A1 | 9/2016 | Frish et al. |
| 2017/0059163 A1 | 3/2017 | Ott et al. |
| 2017/0356654 A1 | 12/2017 | Locke et al. |

FOREIGN PATENT DOCUMENTS

| | | |
|---|---|---|
| EP | 849531 B1 | 5/2005 |
| EP | 1531305 A1 | 5/2005 |
| EP | 1027560 B1 | 8/2005 |
| EP | 1767853 A2 | 3/2007 |
| EP | 1493965 B1 | 8/2008 |
| EP | 1424526 B1 | 4/2011 |
| EP | 1314931 B1 | 3/2012 |
| EP | 1591720 B1 | 3/2012 |
| EP | 1293725 B1 | 5/2012 |
| EP | 2481985 A2 | 8/2012 |
| EP | 1978306 B1 | 8/2016 |
| EP | 2479497 B1 | 11/2016 |
| EP | 1906093 B1 | 8/2017 |
| EP | 2932157 B1 | 5/2018 |
| EP | 3060849 B1 | 5/2019 |
| EP | 2825824 B1 | 6/2019 |
| EP | 3052785 B1 | 4/2020 |
| EP | 3055536 B1 | 4/2020 |
| EP | 2962041 B1 | 5/2020 |
| JP | H04-244513 A | 9/1992 |
| JP | 2012-251741 A | 12/2012 |
| KR | 19990054621 A | 7/1999 |
| KR | 20080045060 A | 5/2008 |
| WO | 2014/113105 A2 | 7/2014 |

* cited by examiner

FLOATING PRIMARY VANE SWIRLER

CROSS REFERENCE TO RELATED APPLICATIONS

The present application claims the benefit of Indian Patent Application number 202111043087, filed on Sep. 23, 2021, which is hereby incorporated by reference herein in its entirety.

TECHNICAL FIELD

The present disclosure relates to a swirler assembly for a combustor of a gas turbine engine.

BACKGROUND

Some conventional gas turbine engines are known to include rich-burn combustors that typically use a swirler integrated with a fuel nozzle to deliver a swirled fuel-air mixture to a combustor. A radial-radial swirler is one example of such a swirler and includes a primary radial swirler with a secondary radial swirler connected to each other such that the primary swirler and the secondary swirler are essentially connected together in both an axial direction and a radial direction. A fuel nozzle is disposed within the primary swirler and fuel injected by the fuel nozzle mixes with air swirled radially inward by the primary swirler at the fuel nozzle tip. The fuel nozzle disposed within the primary swirler is generally able to shift radially with respect to the primary swirler, thereby resulting in an offset of the primary swirled air with respect to the fuel injected by the fuel nozzle. This offset can cause non-uniformity in the fuel distribution within a venturi of the secondary swirler.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
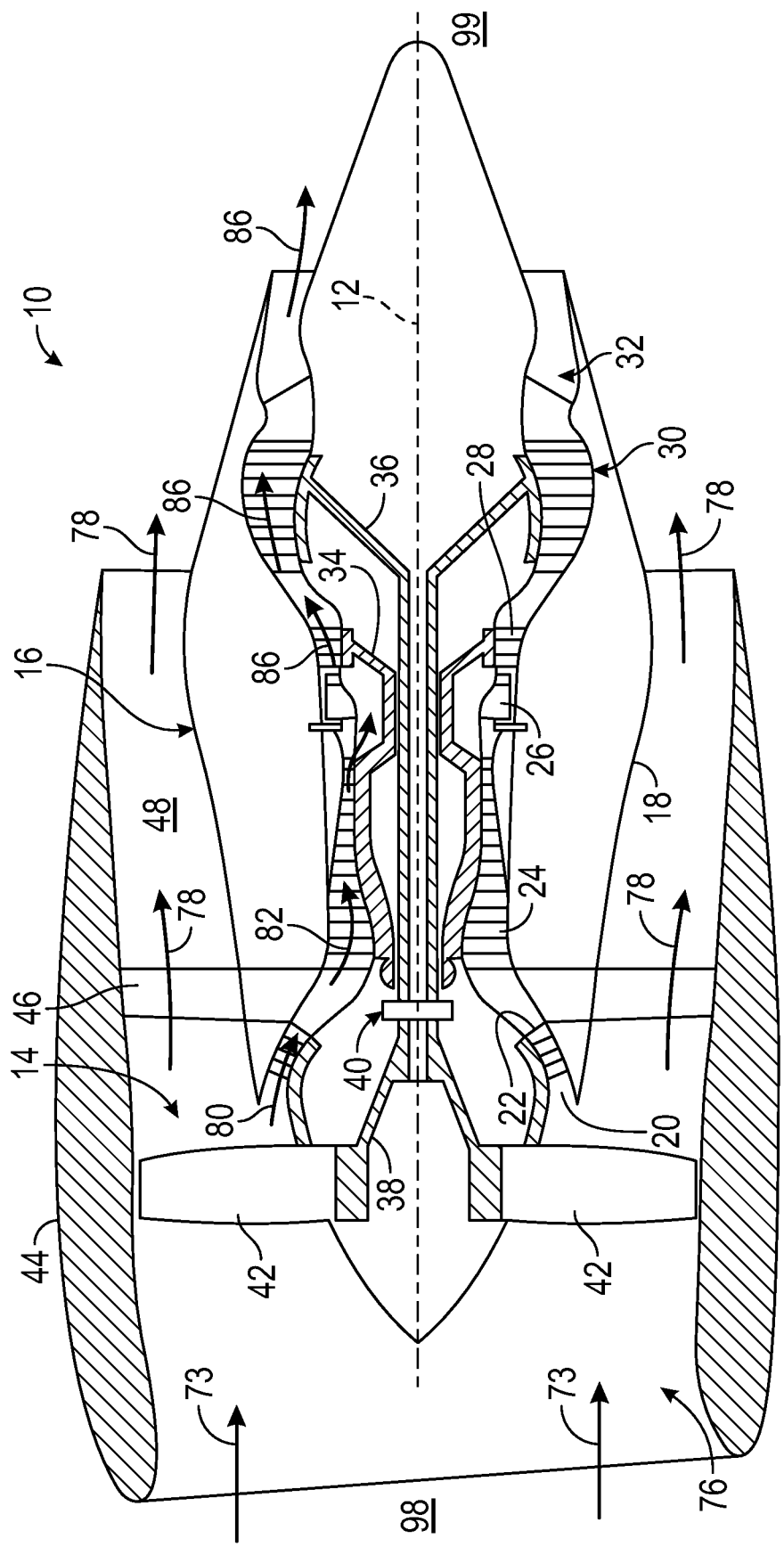
FIG. 1 is a schematic partial cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In a rich-burn combustor that includes a radial-radial swirler, a swirler assembly has both a primary swirler and a secondary swirler that are connected together. A fuel nozzle interfaces with the ferrule plate that, in turn, interfaces with the primary swirler. The primary swirler generally induces a swirl radially inward into a primary mixing zone upstream of a venturi at the tip of the fuel nozzle. Fuel from the fuel nozzle is injected into the swirled primary air flow in the primary mixing zone. In this conventional system, a radial offset can occur between the fuel nozzle relative to the primary vane of the swirler, introducing non-uniformity in the velocity distribution with the venturi that can lead to non-uniformity in the fuel distribution. The non-uniformity of fuel distribution can lead to pockets of high temperature in the primary combustion zone, which can result in higher NOx emissions. In addition, in a gas turbine that uses water injected from the fuel nozzle to reduce NOx emissions, the offset can lead to non-uniformity of water distribution, which leads to high level quenching of the flame on one side, thereby leading to higher CO emissions and a reduction in combustion efficiency.

The present disclosure aims to address the foregoing by restricting the fuel nozzle radial movement with respect the primary swirler flow, but also to allow for radial movement among the component parts of the swirler/fuel nozzle arrangement. Thus, the present disclosure provides for a swirler assembly in which a floating primary swirler interfaces with the secondary swirler to allow radial movement between the primary swirler and the secondary swirler, while maintaining an axial connection between them. In addition, the primary swirler and the fuel nozzle are positioned such that, when the fuel nozzle moves radially, the primary swirler also moves radially with the fuel nozzle.

Thus, the primary swirler floating together with fuel nozzle maintains the radial relationship between the fuel injected by the fuel nozzle and the primary air flow from the primary swirler. Further, the radial swirler is arranged with flow passages that, rather than merely directing the primary swirled air flow radially inward at the fuel nozzle tip, directs the primary air flow radially inward at an angle and in a downstream direction toward a venturi, which is included in the secondary swirler. As a result, the swirler assembly of the present disclosure can provide for a more uniform fuel distribution within the venturi, thereby reducing the NOx and CO emissions.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a ducted turbofan engine, the present disclosure is also applicable to turbomachinery in general, including turbojet, turboprop, and turboshaft gas turbine engines, including marine and industrial turbine engines and auxiliary power units. In addition, the present disclosure is not limited to ducted fan type turbine engines such as that shown in FIG. 1, but can be implemented in unducted fan (UDF) type turbine engines. As shown in FIG. 1, engine 10 has an axial centerline axis 12 that extends therethrough from an upstream end 98 to a downstream end 99 for reference purposes. In general, engine 10 may include a fan assembly 14 and a core engine 16 disposed downstream from the fan assembly 14.

The core engine 16 may generally include an outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration. In other embodiments, although not illustrated, the engine 10 may further include an intermediate pressure (IP) compressor and a turbine rotatable with an intermediate pressure shaft.

As shown in FIG. 1, the fan assembly 14 includes a plurality of fan blades 42 that are coupled to and extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

Figure 2:
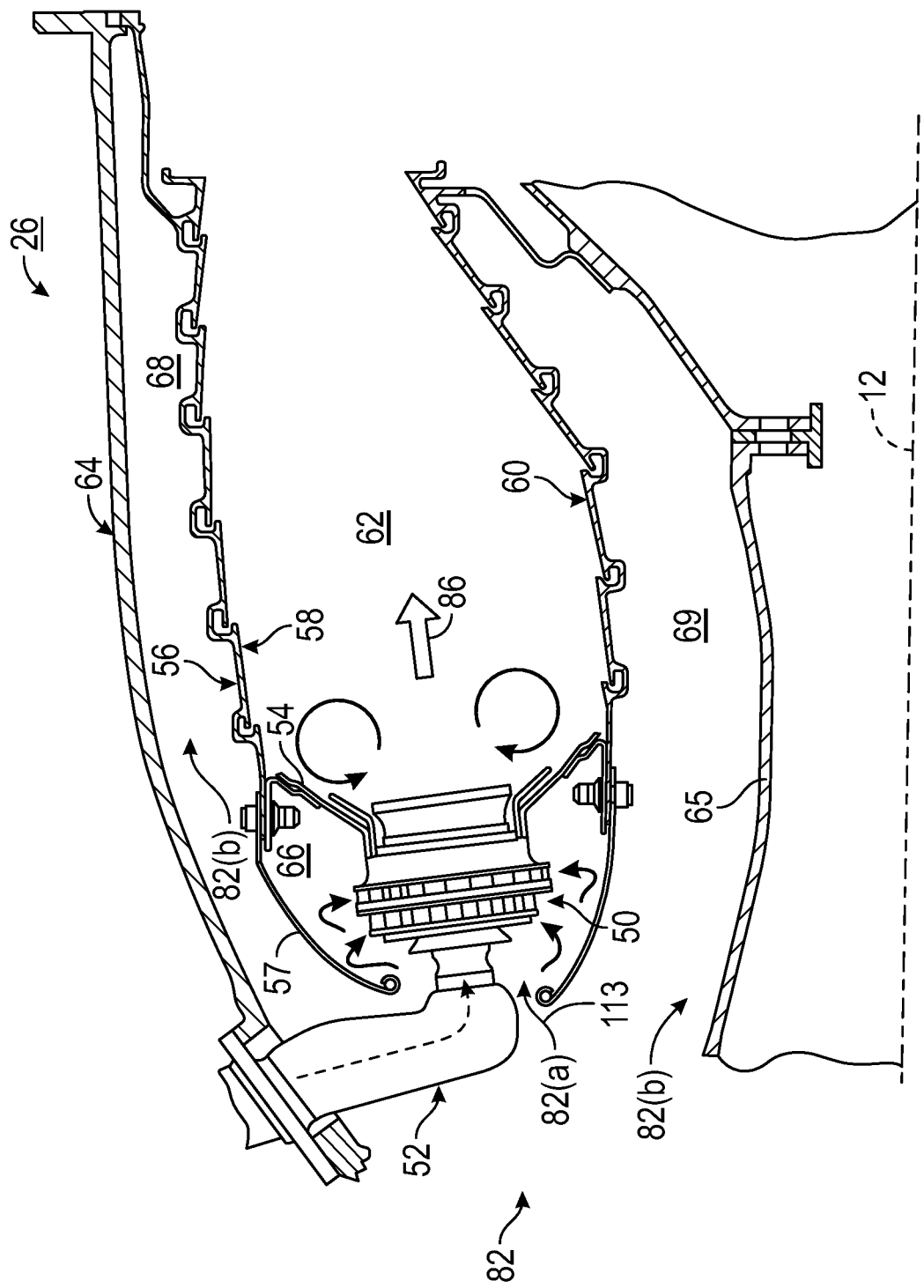
FIG. 2 is a partial cross-sectional side view of an exemplary combustion section, according to an aspect of the present disclosure.

FIG. 2 depicts an exemplary combustion section 26 according to the present disclosure. In FIG. 2, combustion section 26 includes a swirler assembly 50, a fuel nozzle assembly 52, a dome assembly 54, a combustion liner 56, and a cowl 57. The combustion liner 56 includes an annular outer liner 58 and an inner liner 60 forming a combustion chamber 62 therebetween. A pressure plenum 66 is formed within the cowl 57. An outer flow passage 68 is formed between an outer casing 64 and the annular outer liner 58, and an inner flow passage 69 is formed between an inner casing 65 and the annular inner liner 60. Referring back to FIG. 1, in operation, air 73 enters the nacelle 44 at a nacelle inlet 76, and a portion of the air 73 enters the compressor section (22/24) as compressor inlet air flow 80, where it is compressed. Another portion of the air 73 enters the bypass airflow passage 48, thereby providing a bypass airflow 78. In FIG. 2, compressed air 82 from the compressor section (22/24) enters the combustion section 26 via a diffuser (not shown). A portion of the compressed air 82 (*a*) enters the cowl 57 to the pressure plenum 66, while another portion of the compressed air 82 (*b*) passes to the outer flow passage 68 and to the inner flow passage 69. As will be described below, compressed air 82 (*a*) in the pressure plenum 66 passes through the swirler assembly 50 to mix with fuel injected by the fuel nozzle assembly 52 and is ignited to generate combustion product gases 86.

Figure 3:
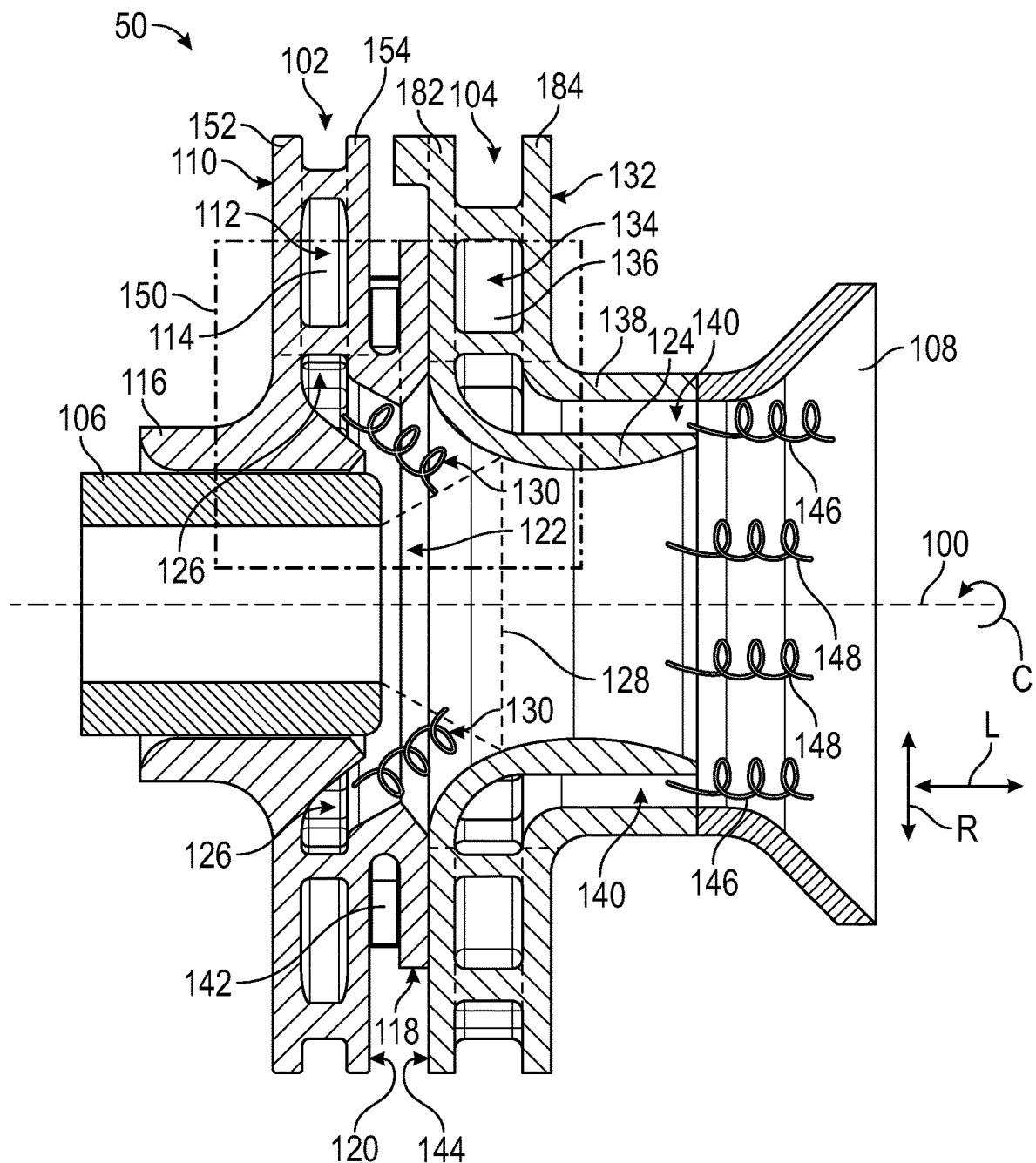
FIG. 3 is a partial cross-sectional side view of an exemplary swirler assembly, according to an aspect of the present disclosure.

FIG. 3 depicts a partial cross-sectional view of the swirler assembly 50. The swirler assembly 50 generally defines a longitudinal direction (L) along a swirler assembly centerline 100, a radial direction (R) extending outward from the swirler assembly centerline 100, and a circumferential direction (C) about the swirler assembly centerline 100. The swirler assembly 50 includes a primary swirler 102 and a secondary swirler 104. A fuel nozzle 106 is disposed within the primary swirler 102, and a flare 108 is connected to the secondary swirler 104. The secondary swirler 104 is suitably connected to dome assembly 54 and the primary swirler 102 is connected to the secondary swirler 104 in a manner that allows the primary swirler 102, and the fuel nozzle 106 disposed therein, to shift in the radial direction, while maintaining a tight fit between the primary swirler 102 and the secondary swirler 104 in the longitudinal direction.

The primary swirler 102 is seen to include a primary swirl portion 110 defining a primary swirl passage 112 having a plurality of primary swirl vanes 114 therewithin. The primary swirl vanes 114 induce a radial swirl into air passing through the primary swirl passage 112. A fuel nozzle connecting portion 116 is arranged radially inward of the primary swirl portion 110 and is configured to connect with the fuel nozzle 106. A primary swirler connecting portion 118 is arranged on a downstream side 120 of the primary swirl portion 110 and has a primary swirler flow opening 122 therethrough. The primary swirler connecting portion 118 is configured to connect with the secondary swirler 104 in a manner that permits the primary swirler 102, and the fuel nozzle 106 connected thereto to have radial movement between the primary swirler 102 and the secondary swirler 104 (e.g., to shift or move in the radial direction), but to retain a tight fit between the primary swirler 102 and the secondary swirler 104 in the longitudinal direction. One configuration of a primary swirler connecting portion 118 will be discussed in more detail below. The primary swirler flow opening 122 allows for a fuel-air mixture to pass from the primary swirler 102 to a venturi 124 of the secondary swirler 104. The fuel nozzle connecting portion 116 and the primary swirler connecting portion 118 define a primary oxidizer flow passage 126 therebetween that is in fluid communication with the primary swirl passage 112. The primary oxidizer flow passage 126 may extend at least partially in the longitudinal direction (L). For example, as will be described below, the primary oxidizer flow passage 126 may have an outlet that directs a flow of air longitudinally in the downstream direction, or may have an outlet that directs the flow of air radially inward at an angle so as to direct the air both downstream and inward. Swirled primary air 130 from the primary swirl passage 112 flows through the primary oxidizer flow passage 126 so that the swirled primary air 130 mixes with a fuel 128 injected by the fuel nozzle 106. Various configurations of the primary oxidizer flow passage 126 will be described in more detail below.

Referring still to FIG. 3, the secondary swirler 104 includes a secondary swirl portion 132 defining a secondary swirl passage 134 having a plurality of secondary swirl vanes 136 therewithin. The secondary swirler 104 also includes a secondary annular axial wall 138 extending in the longitudinal direction downstream of the secondary swirl portion 132, and the venturi 124, which is arranged radially inward of the secondary swirl portion 132 and the secondary annular axial wall 138. A secondary oxidizer flow passage 140 is defined between the venturi 124, and the secondary swirl portion 132 and the secondary annular axial wall 138. The secondary oxidizer flow passage 140 provides for a flow of air 146, that is swirled by the secondary swirl vanes 136 of the secondary swirl portion 132, to flow outside of the venturi 124 and into the flare 108, where it is mixed with a fuel-air mixture 148 that flows from the venturi 124 into the flare 108. The secondary swirler 104 also includes a secondary swirler connecting member 142 arranged on an upstream side 144 of the secondary swirler 104. The connection between the primary swirler 102 and the secondary swirler 104 will be described in more detail below.

Figure 4:
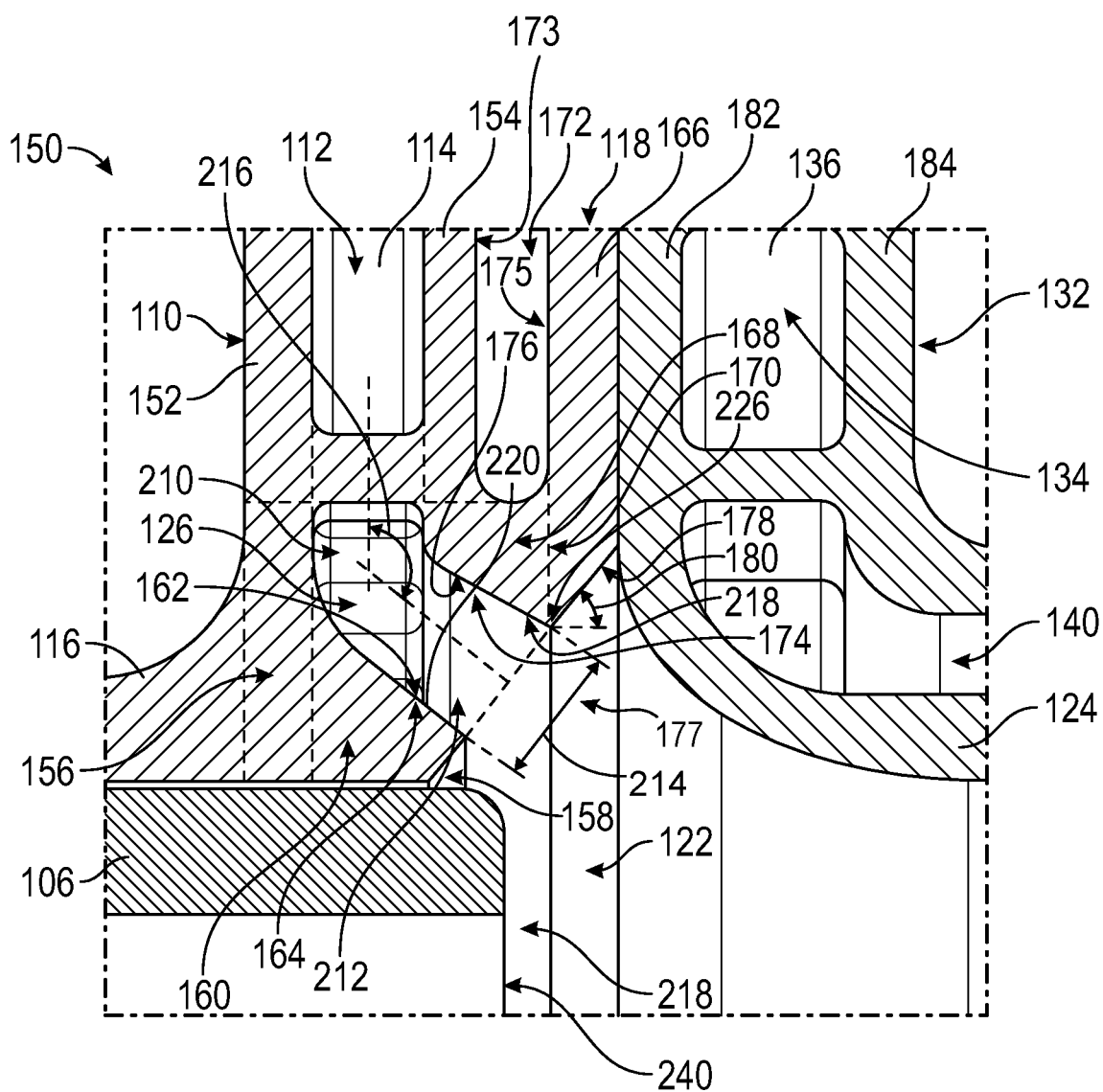
FIG. 4 is a partial cross-sectional view, taken at detail 150 of FIG. 3, of an exemplary swirler assembly, according to an aspect of the present disclosure.

FIG. 4 is a partial cross-sectional view taken at detail 150 of FIG. 3. In FIG. 4, the primary swirl portion 110 is seen to include a first primary swirl portion radial wall 152, a second primary swirl portion radial wall 154 downstream of the first primary swirl portion radial wall 152, and the plurality of primary swirl vanes 114 connecting the first primary swirl portion radial wall 152 and the second primary swirl portion radial wall 154. Both the first primary swirl portion radial wall 152 and the second primary swirl portion radial wall 154 extend circumferentially about the swirler assembly centerline 100. The plurality of primary swirl vanes 114 are circumferentially spaced about the swirler assembly centerline 100 (FIG. 3) and are arranged to induce a swirl to air flowing through the primary swirl passage 112.

The fuel nozzle connecting portion 116 includes an annular fuel nozzle wall 156 extending radially between a fuel nozzle opening 158 to the first primary swirl portion radial wall 152, and includes a fuel nozzle wall radially inward portion 160 extending downstream relative to the first primary swirl portion radial wall 152. A primary oxidizer flow passage upstream surface 162 of the primary oxidizer flow passage 126 is defined by a radially outer surface 164 of the fuel nozzle wall radially inward portion 160.

The primary swirler connecting portion 118 has a primary swirler connecting portion radial wall 166 having a primary swirler connecting portion radial wall opening 177 therethrough that defines, at least in part, the primary swirler flow opening 122. As seen in FIG. 4, the primary swirler connecting portion radial wall opening 177 through the primary swirler connecting portion radial wall 166 may have a conical surface 178 that has a conical profile extending radially outward in a downstream direction with respect to the swirler assembly centerline 100. An angle 180 of the conical surface 178 may range from, for example, thirty degrees to seventy degrees, with respect to the swirler assembly centerline 100. The primary swirler connecting portion radial wall 166 also includes a primary swirler connecting portion connecting wall 168 connecting a radially inward portion 170 of the primary swirler connecting portion radial wall 166 and the second primary swirl portion radial wall 154, so as to define a primary swirler connecting portion gap 172 between a downstream surface 173 of the second primary swirl portion radial wall 154 and an upstream surface 175 of the primary swirler connecting portion radial wall 166. A radially inner surface 174 of the primary swirler connecting portion connecting wall 168 defines a primary oxidizer flow passage downstream surface 176 of the primary oxidizer flow passage 126.

The secondary swirl portion 132 includes a first secondary swirl portion radial wall 182 on the upstream side of the secondary swirl portion 132, and a second secondary swirl portion radial wall 184 on a downstream side of the secondary swirl portion 132. The plurality of secondary swirler vanes 136 extend between and connect the first secondary swirl portion radial wall 182 and the second secondary swirl portion radial wall 184. Similar to the primary swirl vanes 114, the secondary swirl vanes 136 are circumferentially spaced about the swirler assembly centerline 100 and are arranged to induce a swirl to air flowing through the secondary swirl passage 134.

Figure 5:
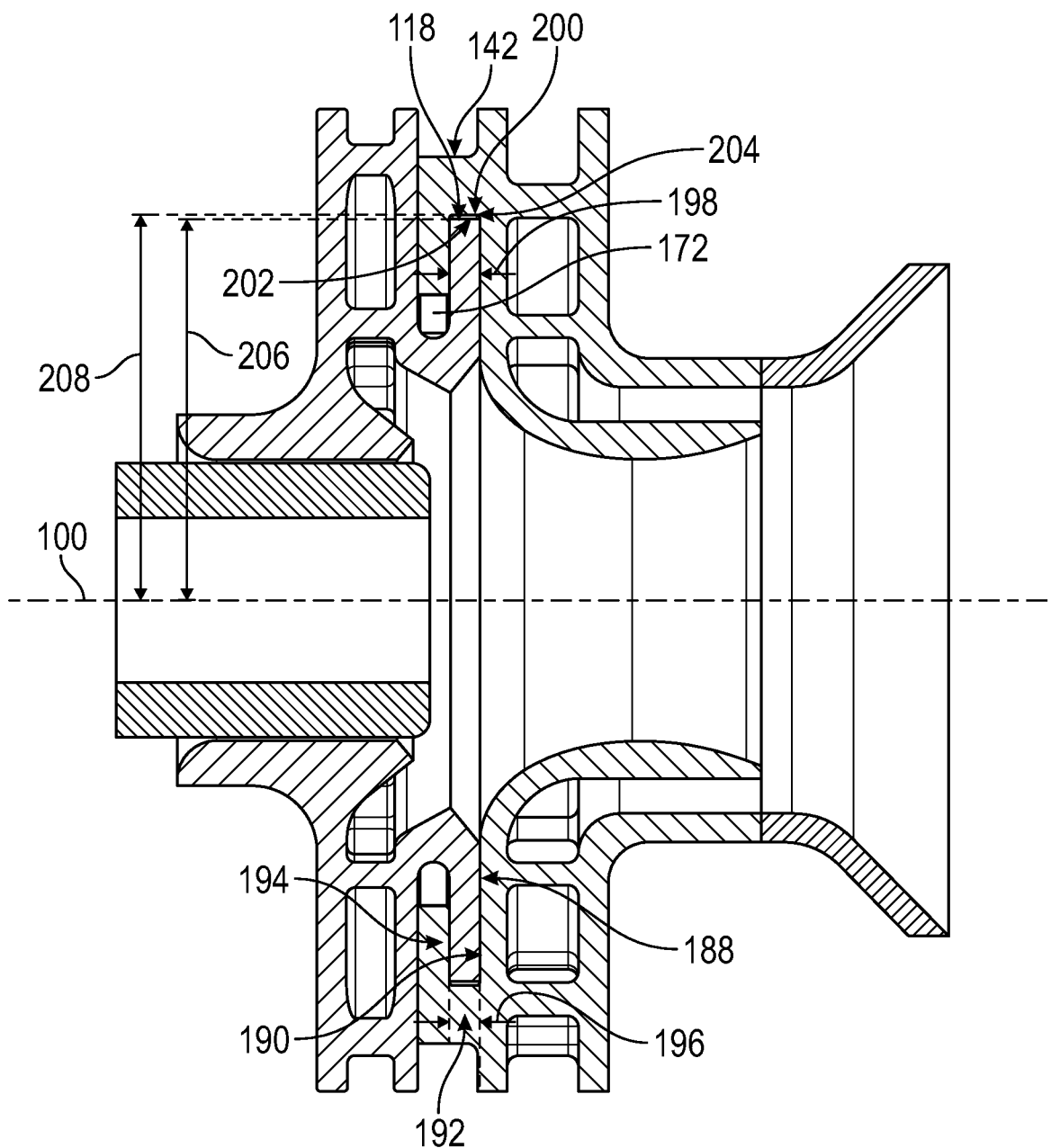
FIG. 5 is a partial cross-sectional top view of an exemplary swirler assembly, according to an aspect of the present disclosure.
Figure 7:
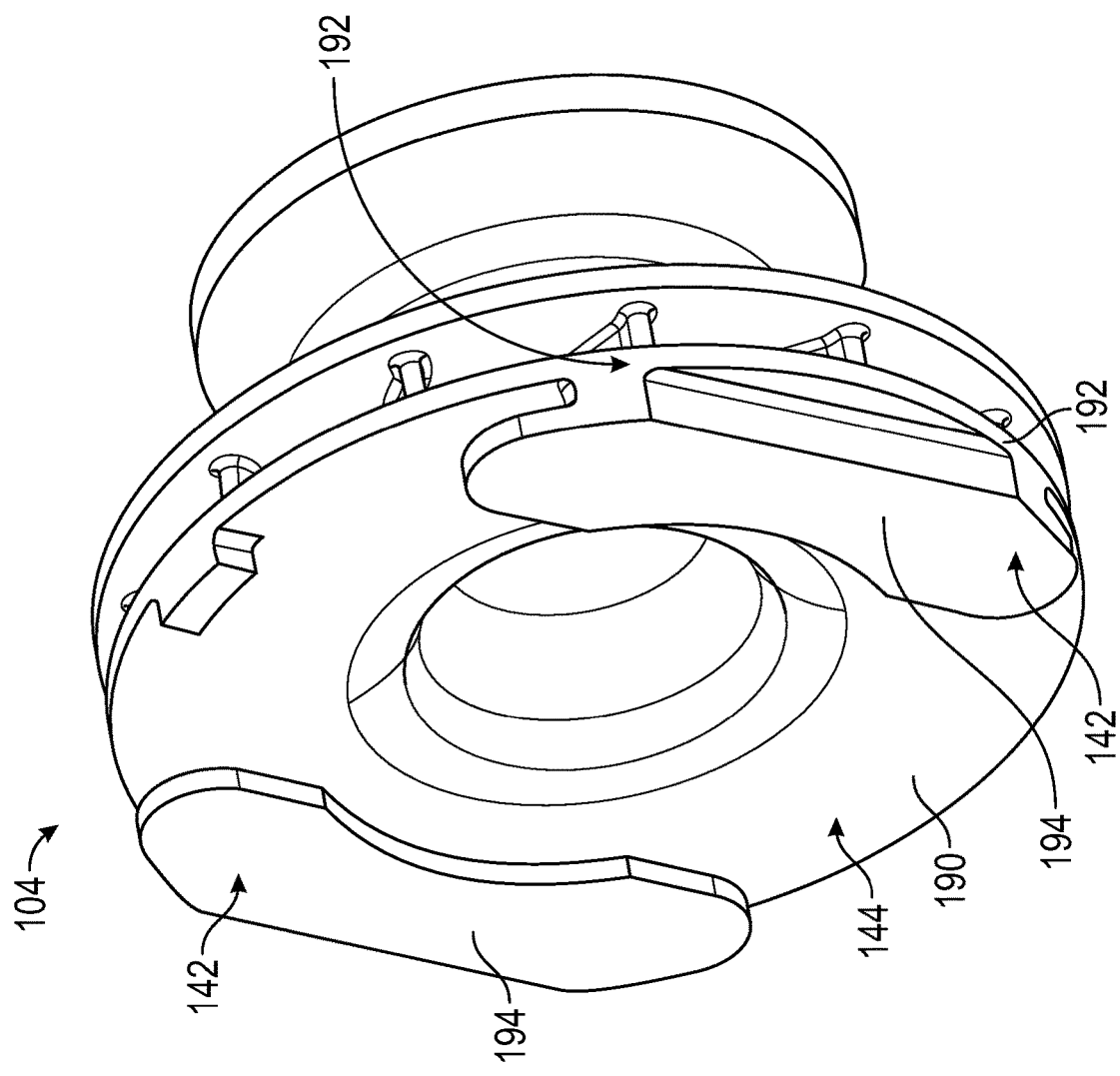
FIG. 7 is a perspective view of an exemplary secondary swirler of a swirler assembly, according to an aspect of the present disclosure.
Figure 6:
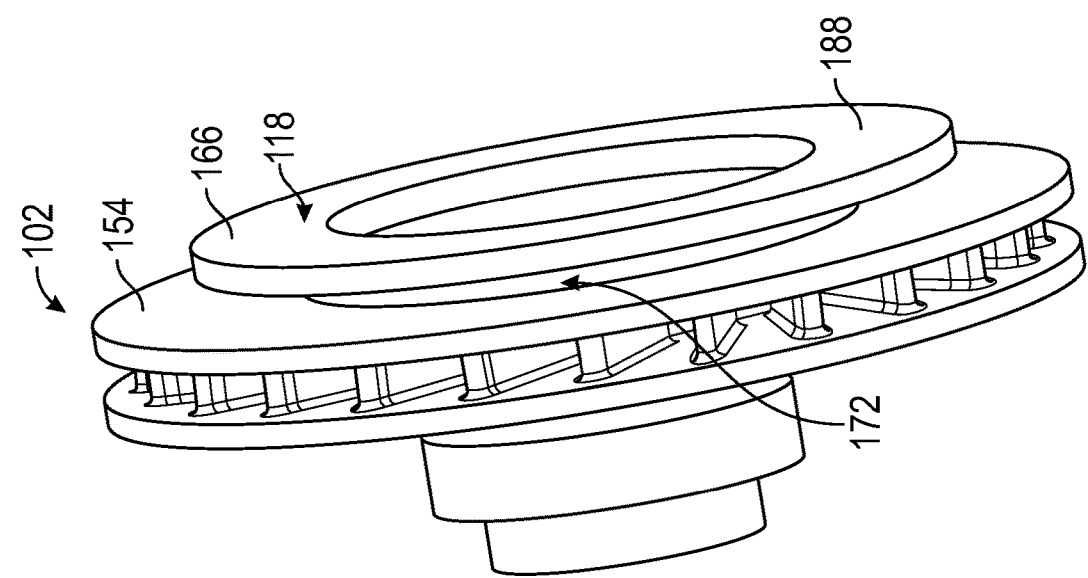
FIG. 6 is a perspective view of an exemplary primary swirler of a swirler assembly, according to yet another aspect of the present disclosure.

An exemplary connection between the primary swirler 102 and the secondary swirler 104 will now be described with regard to FIGS. 5 to 7. FIG. 5 is a partial cross-sectional view of a swirler assembly 50 similar to FIG. 3, but with the swirler assembly 50 rotated ninety degrees about the swirler assembly centerline 100. FIG. 6 is a perspective view of a downstream side of the primary swirler 102, and FIG. 7 is a perspective view of an upstream side of the secondary swirler 104. In FIGS. 5 and 6, the primary swirler connecting portion 118 is shown to constitute the primary swirler connecting portion radial wall 166 as essentially being an annular wall that extends circumferentially about the swirler assembly centerline 100, with the primary swirler connecting portion gap 172 provided between the primary swirler connecting portion radial wall 166 and the second primary swirl portion radial wall 154. Of course, the primary swirler connecting portion radial wall 166 need not extend a full three-hundred-sixty degrees about the swirler assembly centerline 100, and other arrangements may be implemented, as long as at least a portion of the primary swirler connecting portion radial wall 166 engages with the secondary swirler connecting members 142.

Referring to FIGS. 5 and 7, as was discussed above, the secondary swirler connecting members 142 are disposed on the upstream side 144 of the secondary swirler 104. In one aspect shown in FIG. 7, the secondary swirler connecting members 142 are shown to include a plurality of standoffs 192 and retaining members 194 connected to the plurality of standoffs 192. The retaining members 194 are configured to fit within the primary swirler connecting portion gap 172 of the primary swirler connecting portion 118. A height 196 of the standoffs 192 may be slightly greater than a thickness 198 of the primary swirler connecting portion radial wall 166 so as to engage a downstream surface 188 of the primary swirler connecting portion radial wall 166 with an upstream surface 190 of the first secondary swirl portion radial wall 182 to provide a tight fit between the downstream surface 188 and the upstream surface 190, but yet loose enough to allow the primary swirler 102 to shift radially with respect to the secondary swirler 104. In addition, a distance 206 from the swirler assembly centerline 100 to a radially outer surface 202 of the primary swirler connecting portion radial wall 166, and a distance 208 from the swirler assembly centerline 100 to an inner surface 200 of the standoffs 192, may be configured so as to form a gap 204 between the inner surface 200 and the radially outer surface 202 in order to allow the primary swirler 102 to shift radially with respect to the secondary swirler 104. A size of the gap 204 may be set such that the inner surface 200 of the standoffs 192 acts as a radial stop so as to limit the amount of radial shift of the primary swirler 102 with respect to the secondary swirler 104.

Various arrangements of the primary oxidizer flow passage 126 will now be described with regard to FIGS. 4 and 8. Referring again to FIG. 4, the primary oxidizer flow passage 126 is seen to include an inlet end 210 and an outlet end 212. The inlet end 210 of the primary oxidizer flow passage 126 is seen to extend radially inward toward the swirler assembly centerline 100, and the outlet end 212 of the primary oxidizer flow passage 126 extends downstream in the longitudinal direction, and at an angle 216 radially inward with respect to the radial direction (R) and the swirler assembly centerline 100. In some aspects, the angle 216 may range from fifty degrees to one-hundred-fifty degrees. In a case when the angle 216 is ninety degrees, the outlet end 212 of the primary oxidizer flow passage 126 extends downstream in the longitudinal direction (e.g., parallel with the swirler assembly centerline 100). As seen in FIG. 4, a fuel nozzle tip 240 of the fuel nozzle 106 is aligned longitudinally downstream from the primary swirl passage 112, and the outlet end 212 of the primary oxidizer flow passage 126 is generally aligned with the fuel nozzle tip 240. This arrangement provides for the primary swirled air flow from the primary swirl passage 112 to be provided closer to the fuel nozzle tip 240, where the fuel 128 is injected. In addition, since the fuel nozzle 106 moves together with the primary swirler 102, a more uniformly swirled fuel-air mixture can be obtained within the primary swirler 102. Thus, non-uniformity in the velocity distribution within the venturi that can lead to non-uniformity in the fuel distribution can be reduced. Additionally, the pockets of high temperature in the primary combustion zone, which can result in higher NOx emissions, can also be reduced or eliminated. Further, if water is injected from the fuel nozzle for NOx reduction, the non-uniformity of water distribution, which leads to high level quenching of the flame on one side, thereby leading to higher CO emissions and a reduction in combustion efficiency, are also reduced.

In one aspect shown in FIG. 4, the primary oxidizer flow passage upstream surface 162 may be formed so as to have concave curved profile, while the primary oxidizer flow passage downstream surface 176 may be formed to have a convex curved profile. Alternatively, a conical surface 218 of the primary oxidizer flow passage downstream surface 176 may be formed as a conical surface, and a conical surface 220 of the primary oxidizer flow passage upstream surface 162 may be formed as a conical surface. In one aspect, a height 214 of the primary oxidizer flow passage 126 may have a constant height throughout the full length of the primary oxidizer flow passage 126. In another aspect, the primary oxidizer flow passage upstream surface 162 and the primary oxidizer flow passage downstream surface 176 may have a constant area with respect to one another. Alternatively, the primary oxidizer flow passage upstream surface 162 and the primary oxidizer flow passage downstream surface 176 may have either a diverging area with respect to one another, or may have a converging area with respect to one another.

Figure 8:
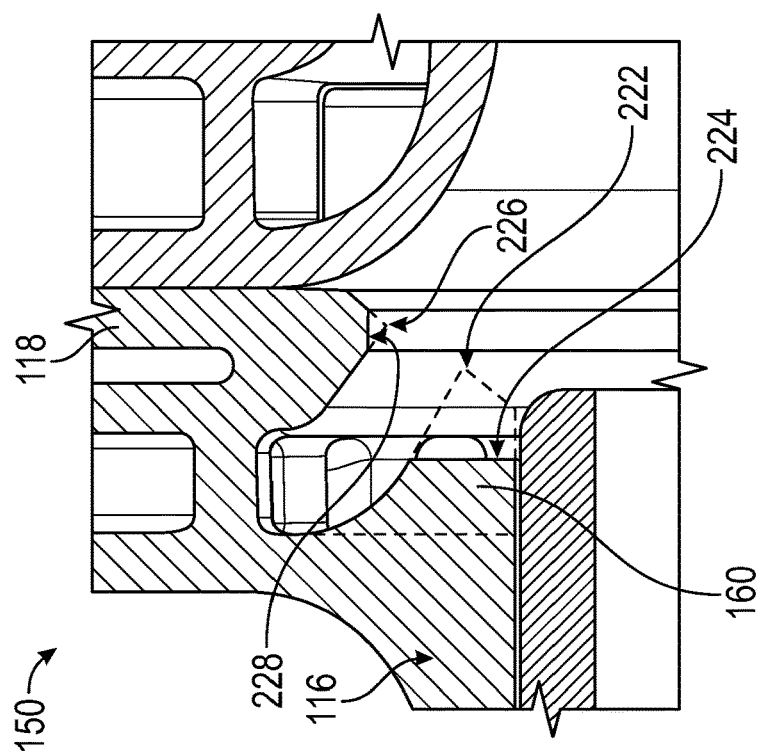
FIG. 8 is a partial cross-sectional view, taken at detail 150 of FIG. 3, of an exemplary swirler assembly, according to another aspect of the present disclosure.

FIG. 8 depicts an arrangement of a primary oxidizer flow passage, according to another aspect of the present disclosure. In the FIG. 8 arrangement, a downstream end 222 of the fuel nozzle wall radially inward portion 160 is seen to be truncated in the upstream direction, so as to define a truncated downstream end surface 224 that extends radially outward with respect to the swirler assembly centerline 100 (FIG. 5). In addition, while the FIG. 4 arrangement may depict the conical surface 178 and the conical surface 218 forming an apex 226, as shown in FIG. 8, the apex 226 may be truncated such that a radially inward surface 228 of the primary swirler connecting portion 118 forms a horizontal surface that extends in the longitudinal direction with respect to the swirler assembly centerline 100.

Figure 9:
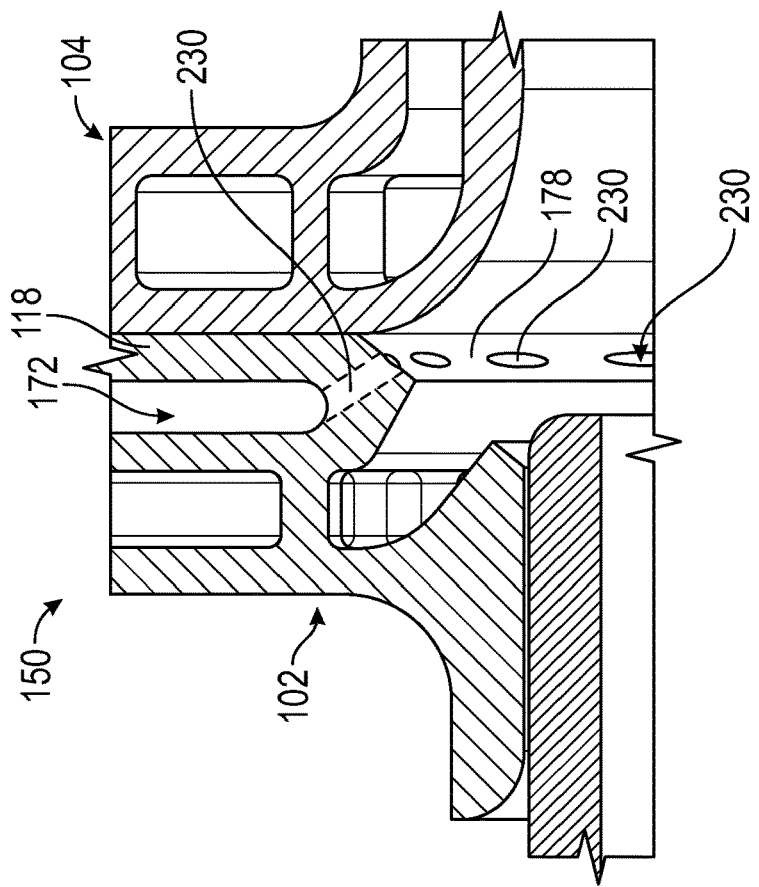
FIG. 9 is a partial cross-sectional view, taken at detail 150 of FIG. 3, of an exemplary swirler assembly, according to yet another aspect of the present disclosure.
Figure 10:
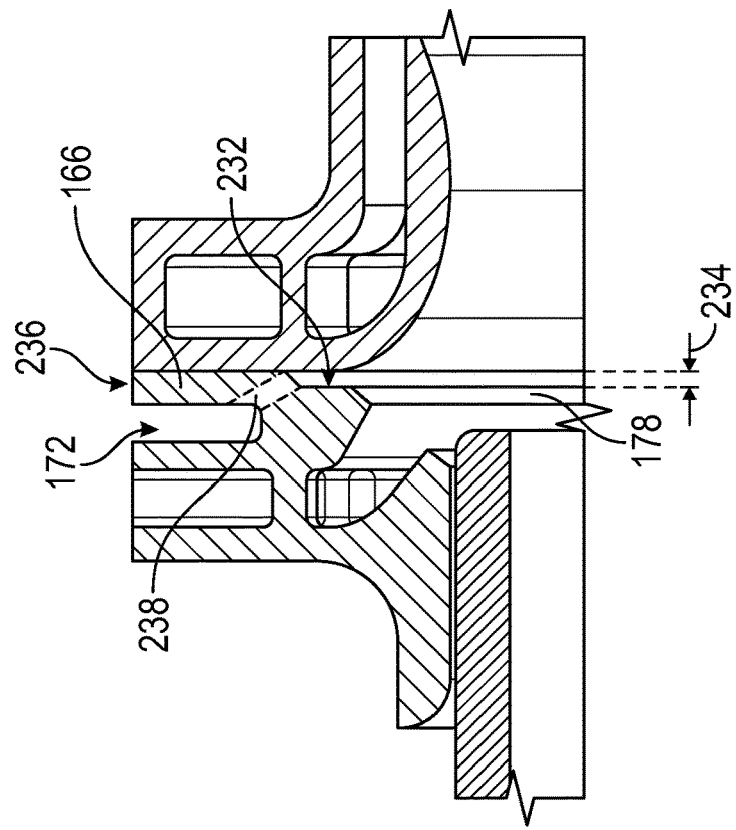
FIG. 10 is a partial cross-sectional view, taken at detail 150 of FIG. 3, of an exemplary swirler assembly, according to still another aspect of the present disclosure.

Additional features of the primary swirler 102 will now be described with regard to FIGS. 9 and 10. In FIG. 9, the primary swirler connecting portion 118 is seen to include a plurality of primary purge orifices 230. The primary purge orifices 230 may extend from the primary swirler connecting portion gap 172 through the conical surface 178, and may extend tangentially with the conical surface 178. That is, the primary purge orifices 230 may be arranged so as to provide a flow of air from the primary swirler connecting portion gap 172 that flows circumferentially about the conical surface 178 tangential to the conical surface 178. FIG. 10 depicts an arrangement of primary purge orifices 238 according to another aspect of the present disclosure. In FIG. 10, the primary swirler connecting portion radial wall 166 includes an annular recess 232 in the conical surface 178 that extends partially between the conical surface 178 and a radially outer end 236 of the primary swirler connecting portion radial wall 166. The primary purge orifices 238 may extend through the primary swirler connecting portion radial wall 166 to the annular recess 232 so as to provide a flow of purge air from the primary swirler connecting portion gap 172 to the annular recess 232. Similar to the primary purge orifices 230 of FIG. 9, the primary purge orifices 238 may be arranged tangentially to provide a tangential flow of the purge air about a circumference of the annular recess 232. A depth 234 of the annular recess 232 may be set based on the size of the primary purge orifices 238 and to provide a desired amount of air flow from the annular recess 232.

Figure 11:
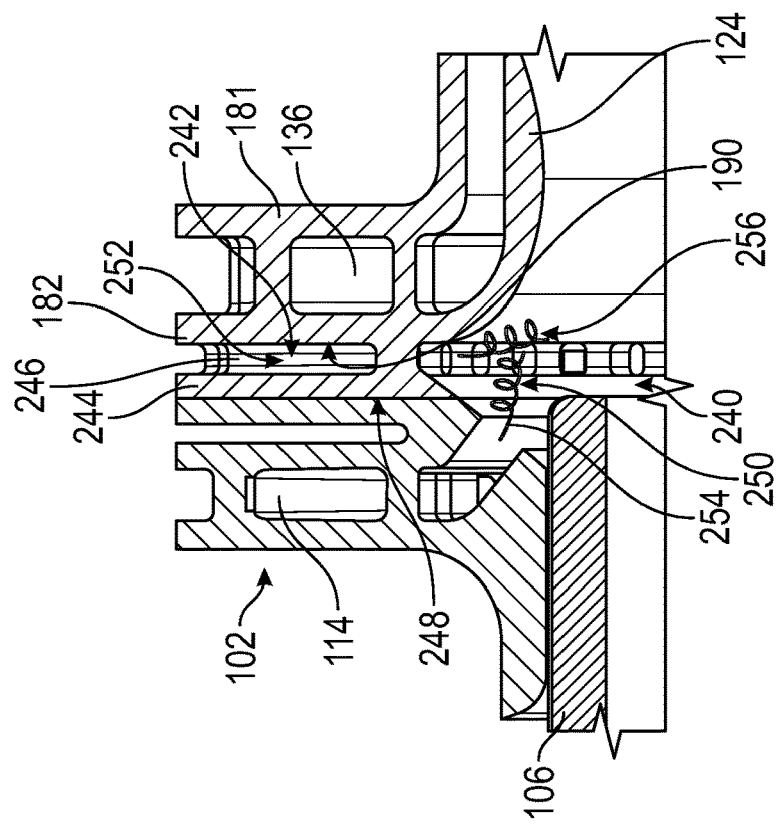
FIG. 11 is a partial cross-sectional view, taken at detail 150 of FIG. 3, of an exemplary swirler assembly, according to yet still another aspect of the present disclosure.

FIG. 11 depicts another aspect of the swirler assembly 50 according to the present disclosure. In the FIG. 11 aspect, the primary swirler 102 may correspond to any of the previously discussed aspects above, and a main difference lies in the arrangement of the secondary swirler 104. In the FIG. 11 aspect, the secondary swirler 104 is seen to include an intermediate swirler 242 connected to the upstream surface 190 of the secondary swirler 104. The intermediate swirler 242 can be seen to include an intermediate swirler radial wall 244 that is an annular wall that extends circumferentially about the swirler assembly centerline 100 (FIG. 5), and includes an intermediate swirler radial wall opening 250 therethrough so that the intermediate swirler 242 is in fluid communication with the venturi 124. A plurality of intermediate swirl vanes 246, which may be similar to the primary swirl vanes 114, are disposed between the intermediate swirler radial wall 244 and the first secondary swirl portion radial wall 182, forming an intermediate swirler flow passage 252 therethrough. The intermediate swirl vanes 246 induce a swirl into a flow of air passing through intermediate swirler flow passage 252 so as to provide a swirled flow of the air circumferentially within the intermediate swirler radial wall opening 250 at an upstream end of the venturi 124. A swirl direction of the intermediate swirl vanes 246 may be in a same direction as a swirl direction of the primary swirl vanes 114. While not shown in FIG. 11, the secondary swirler connecting member 142 is provided at an intermediate swirler radial wall upstream surface 248 of the intermediate swirler radial wall 244. The secondary swirler connecting member 142 in the FIG. 11 aspect may be the same as the aspect described above with regard to FIGS. 3 and 4.

With the FIG. 11 aspect that includes the intermediate swirler 242, to provide for better mixing of the fuel with the primary swirled air flow 254 from the primary oxidizer flow passage 126, and an intermediate swirled air flow 256 from the intermediate swirler 242, the fuel nozzle 106, when installed in the primary swirler 102, may be shifted further downstream. For example, the fuel nozzle 106 may be shifted further downstream so that the fuel nozzle tip 240 is roughly aligned with the intermediate swirler radial wall upstream surface 248.

While the foregoing description relates generally to a gas turbine engine, it can readily be understood that the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A swirler assembly for a gas turbine engine, the swirler assembly comprising: a primary swirler comprising (a) a primary swirl portion defining a primary swirl passage having a plurality of primary swirl vanes therewithin, (b) a fuel nozzle connecting portion arranged radially inward of the primary swirl portion and having a fuel nozzle opening therethrough configured to interface with a fuel nozzle, and (c) a primary swirler connecting portion arranged on a downstream side of the primary swirl portion and having a primary swirler flow opening therethrough, the fuel nozzle connecting portion and the primary swirler connecting portion defining a primary oxidizer flow passage therebetween that is in fluid communication with the primary swirl passage, the primary oxidizer flow passage extending at least partially in a longitudinal direction; and a secondary swirler comprising (a) a venturi, and (b) a secondary swirler connecting member arranged on an upstream side of the secondary swirler, wherein the primary swirler connecting portion and the secondary swirler connecting member engage to interface the primary swirler and the secondary swirler in the longitudinal direction, and to permit radial movement of the primary swirler with respect to the secondary swirler.

The swirler assembly according to any preceding clause, wherein the swirler assembly defines a swirler assembly centerline therethrough, a longitudinal direction along the swirler assembly centerline, a radial direction extending outward from the swirler assembly centerline, and a circumferential direction about the swirler assembly centerline, and the secondary swirler further comprises (c) a secondary swirl portion defining a secondary swirl passage having a plurality of secondary swirl vanes therewithin, and (d) a secondary annular axial wall extending in the longitudinal direction downstream of the secondary swirl portion, the venturi being arranged radially inward of the secondary swirl portion and the secondary annular axial wall, a secondary oxidizer flow passage being defined between the venturi, the secondary swirl portion, and the secondary annular axial wall.

The swirler assembly according to any preceding clause, wherein the primary oxidizer flow passage extends radially inward at an inlet end of the primary oxidizer flow passage, and extends downstream in the longitudinal direction at an outlet end of the primary oxidizer flow passage.

The swirler assembly according to any preceding clause, wherein the primary oxidizer flow passage extends radially inward at an inlet end of the primary oxidizer flow passage, and extends at an angle radially inward and in the longitudinal direction, with respect to the radial direction, at an outlet end of the primary oxidizer flow passage.

The swirler assembly according to any preceding clause, wherein the angle has a range from fifty degrees to one-hundred-fifty degrees between the radial direction and the longitudinal direction.

The swirler assembly according to any preceding clause, wherein the primary swirler flow opening of the primary swirler connecting portion is in fluid communication with the venturi of the secondary swirler.

The swirler assembly according to any preceding clause, wherein the fuel nozzle connecting portion is configured to connect with the fuel nozzle such that a tip of the fuel nozzle is disposed downstream of the primary swirl passage of the primary swirl portion.

The swirler assembly according to any preceding clause, wherein the primary swirl portion comprises (i) a first primary swirl portion radial wall, (ii) a second primary swirl portion radial wall downstream of the first primary swirl portion radial wall, and (iii) the primary swirl vanes connecting the first primary swirl portion radial wall and the second primary swirl portion radial wall, the fuel nozzle connecting portion comprises an annular fuel nozzle wall extending radially between the fuel nozzle opening to the first primary swirl portion radial wall, and including a fuel nozzle wall radially inward portion extending downstream relative to the first primary swirl portion radial wall, a primary oxidizer flow passage upstream surface of the primary oxidizer flow passage being defined by a radially outer surface of the fuel nozzle wall radially inward portion, and the primary swirler connecting portion comprises a primary swirler connecting portion radial wall having the primary swirler flow opening therethrough, and including a connecting wall connecting a radially inward portion of the primary swirler connecting portion radial wall and the second primary swirl portion radial wall so as to define a primary swirler connecting portion gap between the second primary swirl portion radial wall and the primary swirler connecting portion radial wall, a radially inner surface of the connecting wall defining a primary oxidizer flow passage downstream surface of the primary oxidizer flow passage.

The swirler assembly according to any preceding clause, wherein the secondary swirl portion comprises a first secondary swirl portion radial wall on an upstream side of the secondary swirler, the secondary swirler connecting member being arranged on an upstream surface of the first secondary swirl portion radial wall and configured to engage the primary swirler connecting portion radial wall so as to engage a downstream surface of the primary swirler connecting portion radial wall with the upstream surface of the first secondary swirl portion radial wall.

The swirler assembly according to any preceding clause, wherein the primary oxidizer flow passage has a constant height between the primary oxidizer flow passage upstream surface and the primary oxidizer flow passage downstream surface.

The swirler assembly according to any preceding clause, wherein the primary oxidizer flow passage upstream surface and the primary oxidizer flow passage downstream surface have a constant area with respect to one another.

The swirler assembly according to any preceding clause, wherein the primary oxidizer flow passage upstream surface and the primary oxidizer flow passage downstream surface have either a diverging area with respect to one another, or have a converging area with respect to one another.

The swirler assembly according to any preceding clause, wherein a downstream end of the fuel nozzle wall radially inward portion includes a truncated downstream end surface that extends radially outward with respect to the swirler assembly centerline, and the primary swirler connecting portion connecting wall has an inner surface that extends in the longitudinal direction with respect to the swirler assembly centerline.

The swirler assembly according to any preceding clause, wherein the primary swirler connecting portion gap is defined between an upstream surface of the primary swirler connecting portion radial wall and a downstream surface of the second primary swirl portion radial wall, and the secondary swirler connecting member comprises a plurality of retaining members disposed in the primary swirler connecting portion gap.

The swirler assembly according to any preceding clause, wherein the primary oxidizer flow passage upstream surface has a concave curved profile, and the primary oxidizer flow passage downstream surface has a convex curved profile.

The swirler assembly according to any preceding clause, wherein the primary oxidizer flow passage upstream surface has a conical profile at an outlet end of the primary oxidizer flow passage, and the primary oxidizer flow passage downstream surface has a conical profile at the outlet end of the primary oxidizer flow passage.

The swirler assembly according to any preceding clause, wherein the primary swirler connecting portion radial wall includes a primary swirler connecting portion radial wall opening therethrough defining, in part, the primary swirler flow opening, the primary swirler connecting portion radial wall opening defining a conical surface extending radially outward in a downstream direction with respect to the swirler assembly centerline.

The swirler assembly according to any preceding clause, wherein the primary swirler connecting portion radial wall includes an annular recess extending partially between the conical surface and a radially outer end of the primary swirler connecting portion radial wall, and the primary swirler connecting portion includes a plurality of primary purge orifices extending through the primary swirler connecting portion radial wall to the annular recess.

The swirler assembly according to any preceding clause, wherein the primary swirler connecting portion includes a plurality of primary purge orifices extending from the primary swirler connecting portion gap through the conical surface of the primary swirler connecting portion radial wall opening, and the plurality of primary purge orifices are arranged to provide a tangential flow of oxidizer about a circumference of the conical surface of the primary swirler connecting portion radial wall.

The swirler assembly according to any preceding clause, wherein the secondary swirler further comprises an intermediate swirler arranged on an upstream surface of the secondary swirl portion, the intermediate swirler being in fluid communication with the venturi, and the secondary swirler connecting member being arranged on an upstream surface of the intermediate swirler, and the primary swirler provides a primary flow of the oxidizer from the primary oxidizer flow passage at least partially in the longitudinal direction, and the intermediate swirler provides a flow of the oxidizer radially inward in the radial direction.

Although the foregoing description is directed to some exemplary embodiments of the present disclosure, other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A swirler assembly for a gas turbine engine, the swirler assembly comprising:
   a primary swirler comprising (a) a primary swirl portion defining a primary swirl passage having a plurality of primary swirl vanes therewithin, (b) a fuel nozzle connecting portion arranged radially inward of the primary swirl portion and having a fuel nozzle opening therethrough configured to interface with a fuel nozzle, and (c) a primary swirler connecting portion arranged on a downstream side of the primary swirl portion and having a primary swirler flow opening therethrough, the fuel nozzle connecting portion and the primary swirler connecting portion defining a primary oxidizer flow passage therebetween that is in fluid communication with the primary swirl passage, the primary oxidizer flow passage extending at least partially in a longitudinal direction; and
   a secondary swirler comprising (a) a venturi, and (b) a secondary swirler connecting member arranged on an upstream side of the secondary swirler,
   wherein the primary swirler connecting portion and the secondary swirler connecting member engage to interface the primary swirler and the secondary swirler in the longitudinal direction, and to permit radial movement of the primary swirler with respect to the secondary swirler,
   wherein the swirler assembly defines a swirler assembly centerline therethrough, the longitudinal direction along the swirler assembly centerline, a radial direction extending outward from the swirler assembly centerline, and a circumferential direction about the swirler assembly centerline, and
   the secondary swirler further comprises (c) a secondary swirl portion defining a secondary swirl passage having a plurality of secondary swirl vanes therewithin, and (d) a secondary annular axial wall extending in the longitudinal direction downstream of the secondary swirl portion, the venturi being arranged radially inward of the secondary swirl portion and the secondary annular axial wall, a secondary oxidizer flow passage being defined between the venturi, the secondary swirl portion, and the secondary annular axial wall, and
   wherein the primary swirl portion comprises (i) a first primary swirl portion radial wall, (ii) a second primary swirl portion radial wall downstream of the first primary swirl portion radial wall, and (iii) the primary swirl vanes connecting the first primary swirl portion radial wall and the second primary swirl portion radial wall,
   the fuel nozzle connecting portion comprises an annular fuel nozzle wall extending radially between the fuel nozzle opening to the first primary swirl portion radial wall, and including a fuel nozzle wall radially inward portion extending downstream relative to the first primary swirl portion radial wall, a primary oxidizer flow passage upstream surface of the primary oxidizer flow passage being defined by a radially outer surface of the fuel nozzle wall radially inward portion, and
   the primary swirler connecting portion comprises a primary swirler connecting portion radial wall having the primary swirler flow opening therethrough, and including a connecting wall connecting a radially inward portion of the primary swirler connecting portion radial wall and the second primary swirl portion radial wall so as to define a primary swirler connecting portion gap between the second primary swirl portion radial wall and the primary swirler connecting portion radial wall, a radially inner surface of the connecting wall defining a primary oxidizer flow passage downstream surface of the primary oxidizer flow passage.

2. The swirler assembly according to claim 1, wherein the primary oxidizer flow passage extends radially inward at an inlet end of the primary oxidizer flow passage, and extends downstream in the longitudinal direction at an outlet end of the primary oxidizer flow passage.

3. The swirler assembly according to claim 1, wherein the primary oxidizer flow passage extends radially inward at an inlet end of the primary oxidizer flow passage, and extends at an angle radially inward and in the longitudinal direction, with respect to the radial direction, at an outlet end of the primary oxidizer flow passage.

4. The swirler assembly according to claim 3, wherein the angle has a range from fifty degrees to one-hundred-fifty degrees between the radial direction and the longitudinal direction.

5. The swirler assembly according to claim 1, wherein the primary swirler flow opening of the primary swirler connecting portion is in fluid communication with the venturi of the secondary swirler.

6. The swirler assembly according to claim 1, wherein the fuel nozzle connecting portion is configured to connect with the fuel nozzle such that a tip of the fuel nozzle is disposed downstream of the primary swirl passage of the primary swirl portion.

7. The swirler assembly according to claim 1, wherein the secondary swirl portion comprises a first secondary swirl portion radial wall on the upstream side of the secondary swirler, the secondary swirler connecting member being arranged on an upstream surface of the first secondary swirl portion radial wall and configured to engage the primary swirler connecting portion radial wall so as to engage a downstream surface of the primary swirler connecting portion radial wall with the upstream surface of the first secondary swirl portion radial wall.

8. The swirler assembly according to claim 1, wherein the primary oxidizer flow passage has a constant height between the primary oxidizer flow passage upstream surface and the primary oxidizer flow passage downstream surface.

9. The swirler assembly according to claim 1, wherein the primary oxidizer flow passage upstream surface and the primary oxidizer flow passage downstream surface have a constant area with respect to one another.

10. The swirler assembly according to claim 1, wherein the primary oxidizer flow passage upstream surface and the primary oxidizer flow passage downstream surface have either a diverging area with respect to one another, or have a converging area with respect to one another.

11. The swirler assembly according to claim 1, wherein a downstream end of the fuel nozzle wall radially inward portion includes a truncated downstream end surface that extends radially outward with respect to the swirler assembly centerline, and the primary swirler connecting portion connecting wall has an inner surface that extends in the longitudinal direction with respect to the swirler assembly centerline.

12. The swirler assembly according to claim 1, wherein the primary swirler connecting portion gap is defined between an upstream surface of the primary swirler connecting portion radial wall and a downstream surface of the second primary swirl portion radial wall, and the secondary swirler connecting member comprises a plurality of retaining members disposed in the primary swirler connecting portion gap.

13. The swirler assembly according to claim 1, wherein the primary oxidizer flow passage upstream surface has a concave curved profile, and the primary oxidizer flow passage downstream surface has a convex curved profile.

14. The swirler assembly according to claim 1, wherein the primary oxidizer flow passage upstream surface has a conical profile at an outlet end of the primary oxidizer flow passage, and the primary oxidizer flow passage downstream surface has a conical profile at the outlet end of the primary oxidizer flow passage.

15. The swirler assembly according to claim 1, wherein the primary swirler connecting portion radial wall includes a primary swirler connecting portion radial wall opening therethrough defining, in part, the primary swirler flow opening, the primary swirler connecting portion radial wall opening being a conical opening extending radially outward in a downstream direction with respect to the swirler assembly centerline.

16. The swirler assembly according to claim 15, wherein the primary swirler connecting portion radial wall includes an annular recess extending partially between the conical opening and a radially outer end of the primary swirler connecting portion radial wall, and
the primary swirler connecting portion includes a plurality of primary purge orifices extending through the primary swirler connecting portion radial wall to the annular recess.

17. The swirler assembly according to claim 15, wherein the primary swirler connecting portion includes a plurality of primary purge orifices extending from the primary swirler connecting portion gap through the conical opening of the primary swirler connecting portion radial wall opening, and the plurality of primary purge orifices are arranged to provide a tangential flow of oxidizer about a circumference of the conical opening of the primary swirler connecting portion radial wall.

18. The swirler assembly according to claim 1,
wherein the secondary swirler further comprises an intermediate swirler arranged on an upstream surface of the secondary swirl portion, the intermediate swirler being in fluid communication with the venturi, and the secondary swirler connecting member being arranged on an upstream surface of the intermediate swirler, and
the primary swirler provides a primary flow of an oxidizer from the primary oxidizer flow passage at least partially in the longitudinal direction, and the intermediate swirler provides a flow of the oxidizer radially inward in the radial direction.

* * * * *